US011708062B2

(12) United States Patent
Salter et al.

(10) Patent No.: US 11,708,062 B2
(45) Date of Patent: Jul. 25, 2023

(54) CONTROLLING VEHICLE COMPONENTS TO ADJUST PASSENGER COMPARTMENT AIRFLOW

(71) Applicant: Ford Global Technologies, LLC, Dearborn, MI (US)

(72) Inventors: Stuart C. Salter, White Lake, MI (US); Paul Kenneth Dellock, Northville, MI (US); David Brian Glickman, Southfield, MI (US); David M. Diamond, Canton, MI (US); Clayton Benjamin Ford, Dearborn, MI (US); Alexander Douglas Long, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 326 days.

(21) Appl. No.: 17/222,687

(22) Filed: Apr. 5, 2021

(65) Prior Publication Data

US 2022/0314957 A1    Oct. 6, 2022

(51) Int. Cl.
| | |
|---|---|
| *B60W 10/30* | (2006.01) |
| *B60K 11/08* | (2006.01) |
| *B60Q 9/00* | (2006.01) |
| *E05F 15/71* | (2015.01) |
| *B60H 1/00* | (2006.01) |

(52) U.S. Cl.
CPC ......... *B60W 10/30* (2013.01); *B60H 1/00464* (2013.01); *B60K 11/085* (2013.01); *B60Q 9/00* (2013.01); *E05F 15/71* (2015.01); *B60W 2520/10* (2013.01); *B60W 2555/20* (2020.02); *B60W 2710/30* (2013.01); *E05Y 2400/44* (2013.01); *E05Y 2400/45* (2013.01); *E05Y 2900/55* (2013.01)

(58) Field of Classification Search
CPC ............ B60W 10/30; B60W 2520/20; B60W 2555/20; B60W 2710/30; B60H 1/00464; B60H 1/262; E05F 15/71; E05Y 2400/44; E05Y 2400/45; E05Y 2900/55; E05Y 2900/542
See application file for complete search history.

(56) References Cited

U.S. PATENT DOCUMENTS

| | | | |
|---|---|---|---|
| 7,151,350 B2 | 12/2006 | Haag et al. | |
| 8,174,146 B2 | 5/2012 | Cheal et al. | |
| 8,838,333 B2 | 9/2014 | Cheal et al. | |
| 9,097,055 B2 | 8/2015 | Cheal et al. | |

(Continued)

*Primary Examiner* — Mussa A Shaawat
(74) *Attorney, Agent, or Firm* — Vichit Chea; Price Heneveld LLP (57) ABSTRACT

A system and method of controlling components of a vehicle are disclosed. The method includes the steps of sensing a current position of a rear closure panel with a closure panel position sensor, sensing a speed of the vehicle with a speed sensor, and sensing a current environmental condition with an environmental precipitation sensor. The method also includes adjusting a degree of openness of at least one window as a result of the closure panel position sensor indicating that the rear closure panel is in an open position, the speed sensor indicating that a speed of the vehicle is greater than zero kilometers per hour (kph), and the current environmental condition that is indicated by the environmental precipitation sensor.

15 Claims, 5 Drawing Sheets

(56) References Cited

U.S. PATENT DOCUMENTS

| | | | |
|---|---|---|---|
| 9,308,802 B2 | 4/2016 | Warburton et al. | |
| 9,636,978 B2 | 5/2017 | Warburton et al. | |
| 9,676,258 B2 | 6/2017 | Warburton et al. | |
| 9,689,982 B2 | 6/2017 | Herthan | |
| 9,909,347 B2 | 3/2018 | Warburton et al. | |
| 2007/0057525 A1* | 3/2007 | Yui | E05F 1/10 |
| | | | 296/55 |
| 2007/0210737 A1* | 9/2007 | Brander | E05F 15/71 |
| | | | 318/483 |
| 2009/0243342 A1* | 10/2009 | Christensen | B60J 5/103 |
| | | | 296/193.08 |
| 2010/0264689 A1* | 10/2010 | Bounds | B60J 5/103 |
| | | | 296/146.8 |
| 2010/0327633 A1* | 12/2010 | Kato | E05F 15/41 |
| | | | 296/223 |
| 2015/0184442 A1* | 7/2015 | Gantman | E05F 15/71 |
| | | | 701/49 |
| 2017/0009677 A1* | 1/2017 | Brinkmann | F02M 35/10301 |
| 2017/0016266 A1* | 1/2017 | Van Wiemeersch | B60K 37/06 |
| 2017/0130508 A1* | 5/2017 | Momcilovich | E05F 15/77 |
| 2017/0361698 A1* | 12/2017 | Hussain | F01P 5/06 |
| 2019/0031199 A1* | 1/2019 | Dudar | B60K 11/085 |
| 2020/0115949 A1* | 4/2020 | Jager | B60J 7/0573 |
| 2021/0293072 A1* | 9/2021 | Srivastava | E05F 15/71 |

* cited by examiner

CONTROLLING VEHICLE COMPONENTS TO ADJUST PASSENGER COMPARTMENT AIRFLOW

FIELD OF THE DISCLOSURE

The present disclosure generally relates to vehicle. More specifically, the present disclosure relates to controlling vehicle components to adjust airflow within a passenger compartment.

BACKGROUND OF THE INVENTION

Consumers often compare available features and functionality between vehicles when making a purchasing decision. Accordingly, additional solutions are needed that provide features and functionality that are desirable to consumers.

SUMMARY OF THE INVENTION

According to a first aspect of the present invention, a method of controlling components of a vehicle includes the steps of sensing a current position of a rear closure panel with a closure panel position sensor, sensing a speed of the vehicle with a speed sensor, and sensing a current environmental condition with an environmental precipitation sensor. The method also includes adjusting a degree of openness of at least one window as a result of the closure panel position sensor indicating that the rear closure panel is in an open position, the speed sensor indicating that a speed of the vehicle is greater than zero kilometers per hour (kph), and the current environmental condition that is indicated by the environmental precipitation sensor Embodiments of the first aspect of the invention can include any one or a combination of the following features:

- the step of adjusting a degree of openness of at least one window as a result of the closure panel position sensor indicating that the rear closure panel is in an open position, the speed sensor indicating that a speed of the vehicle is greater than zero kph, and the current environmental condition indicated by the environmental precipitation sensor includes adjusting a first row window of the vehicle to a position that is at least about 15 cm lower than a first raised position when the speed sensor indicates that the speed of the vehicle is greater than zero kph and less than about 25 kph and the current environmental condition is indicated as being free of precipitation by the environmental precipitation sensor; and adjusting a second row window of the vehicle to a position that is at least about 15 cm lower than a second raised position when the speed sensor indicates that the speed of the vehicle is greater than zero kph and less than about 25 kph and the current environmental condition is indicated as being free of precipitation by the environmental precipitation sensor;
- the step of adjusting a degree of openness of at least one window as a result of the closure panel position sensor indicating that the rear closure panel is in an open position, the speed sensor indicating that a speed of the vehicle is greater than zero kph, and the current environmental condition indicated by the environmental precipitation sensor includes adjusting a first row window of the vehicle to a position that is between about 0.1 cm lower than a first raised position and less than about 0.5 cm lower than the first raised position when the speed sensor indicates that the speed of the vehicle is between about 25 kph and less than about 55 kph and the current environmental condition is indicated as being free of precipitation by the environmental precipitation sensor; and adjusting a second row window of the vehicle to a position that is between about 0.1 cm lower than a second raised position and less than about 0.5 cm lower than the second raised position when the speed sensor indicates that the speed of the vehicle is between about 25 kph and less than about 55 kph and the current environmental condition is indicated as being free of precipitation by the environmental precipitation sensor;
- activating an air circulation system of the vehicle when the speed sensor indicates that the speed of the vehicle is between about 25 kph and about 55 kph and the current environmental condition is indicated as being free of precipitation by the environmental precipitation sensor;
- the step of activating an air circulation system of the vehicle includes maximizing a blower speed of a blower of the air circulation system when the speed sensor indicates that the speed of the vehicle is between about 25 kph and about 55 kph and the current environmental condition is indicated as being free of precipitation by the environmental precipitation sensor;
- the step of adjusting a degree of openness of at least one window as a result of the closure panel position sensor indicating that the rear closure panel is in an open position, the speed sensor indicating that a speed of the vehicle is greater than zero kph, and the current environmental condition indicated by the environmental precipitation sensor includes adjusting a second row window of the vehicle to a position that is between about 0.1 cm lower than a second raised position and less than about 0.5 cm lower than the second raised position when the speed sensor indicates that the speed of the vehicle is at least about 55 kph and the current environmental condition is indicated as being free of precipitation by the environmental precipitation sensor;
- activating an air circulation system of the vehicle when the speed sensor indicates that the speed of the vehicle is at least about 55 kph and the current environmental condition is indicated as being free of precipitation by the environmental precipitation sensor; and maximizing a blower speed of a blower of the air circulation system when the speed sensor indicates that the speed of the vehicle is at least about 55 kph and the current environmental condition is indicated as being free of precipitation by the environmental precipitation sensor;
- increasing a degree of openness of an active grill shudder of the vehicle when the speed sensor indicates that the speed of the vehicle is at least about 55 kph;
- notifying a user regarding a reason for the adjusting a degree of openness of at least one window;
- the step of adjusting a degree of openness of at least one window as a result of the closure panel position sensor indicating that the rear closure panel is in an open position, the speed sensor indicating that a speed of the vehicle is greater than zero kph, and the current environmental condition indicated by the environmental precipitation sensor includes adjusting a second row window of the vehicle to a position that is between about 0.1 cm lower than a second raised position and less than about 0.5 cm lower than the second raised position when the current environmental condition is indicated including precipitation by the environmental precipitation sensor;

activating an air circulation system of the vehicle when the current environmental condition is indicated as including precipitation by the environmental precipitation sensor; and maximizing a blower speed of a blower of the air circulation system when the current environmental condition is indicated as including precipitation by the environmental precipitation sensor;

the step of adjusting a degree of openness of at least one window as a result of the closure panel position sensor indicating that the rear closure panel is in an open position, the speed sensor indicating that a speed of the vehicle is greater than zero kph, and the current environmental condition indicated by the environmental precipitation sensor includes adjusting a roof-mounted window of the vehicle to a position that is retracted by at least about 15 cm when compared to a closed position when the speed sensor indicates that the speed of the vehicle is greater than zero kph and less than about 25 kph and the current environmental condition is indicated as being free of precipitation by the environmental precipitation sensor;

the step of adjusting a degree of openness of at least one window as a result of the closure panel position sensor indicating that the rear closure panel is in an open position, the speed sensor indicating that a speed of the vehicle is greater than zero kph, and the current environmental condition indicated by the environmental precipitation sensor includes adjusting a roof-mounted window of the vehicle to a position that is retracted by between about 0.7 cm and about 1.2 cm when compared to a closed position of the roof-mounted window when the speed sensor indicates that the speed of the vehicle is at least about 25 kph;

activating an air circulation system of the vehicle when the current environmental condition is indicated as being free of precipitation by the environmental precipitation sensor;

maximizing a blower speed of a blower of the air circulation system when the current environmental condition is indicated as being free of precipitation by the environmental precipitation sensor; and increasing a degree of openness of an active grill shudder of the vehicle when the speed sensor indicates that the speed of the vehicle is at least about 55 kph.

According to a second aspect of the present disclosure, a vehicle includes a body. A passenger compartment is defined by the body. A first row window is operable between a first raised position and a first fully-opened position relative to a first window aperture. The body defines the first window aperture. A second row window is operable between a second raised position and a second fully-opened position relative to a second window aperture. The body defines the second window aperture. A rear aperture is defined by the body. A rear closure panel is operable between a closed position and an open position relative to the rear aperture. A closure panel position sensor senses a current position of the rear closure panel. An environmental precipitation sensor senses a current environmental condition exterior to the vehicle. A speed sensor senses a current speed of the vehicle. A controller adjusts a degree of openness of at least one window chosen from the first row window and the second row window as a result of the closure panel position sensor indicating that the rear closure panel is in an open position, the speed sensor indicating that a speed of the vehicle is greater than zero kph, and the current environmental condition that is indicated by the environmental precipitation sensor.

Embodiments of the second aspect of the present disclosure can include any one or a combination of the following features:

a roof that defines a roof aperture and a roof-mounted window that is operable between a shut position and a fully-retracted position relative to the roof aperture, wherein the controller adjusts a degree of openness of the roof-mounted window as a result of the closure panel position sensor indicating that the rear closure panel is in the open position, the speed sensor indicating that the speed of the vehicle is greater than zero kph, and the current environmental condition is free of precipitation;

the controller adjusts the degree of openness of the at least one window chosen from the first row window and the second row window to be in closer proximity to the first raised position and the second raised position, respectively, as the speed of the vehicle increases; and an air circulation system that is selectively activated by the controller as a result of the closure panel position sensor indicating that the rear closure panel is in the open position, the speed sensor indicating that the speed of the vehicle is greater than zero kph, and the current environmental condition indicated by the environmental precipitation sensor; and an active grill shudder that is selectively adjusted by the controller to increase a degree of openness of the active grill shudder as a result of the closure panel position sensor indicating that the rear closure panel is in the open position, the speed sensor indicating that the speed of the vehicle is greater than zero kph, and the current environmental condition indicated by the environmental precipitation sensor.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
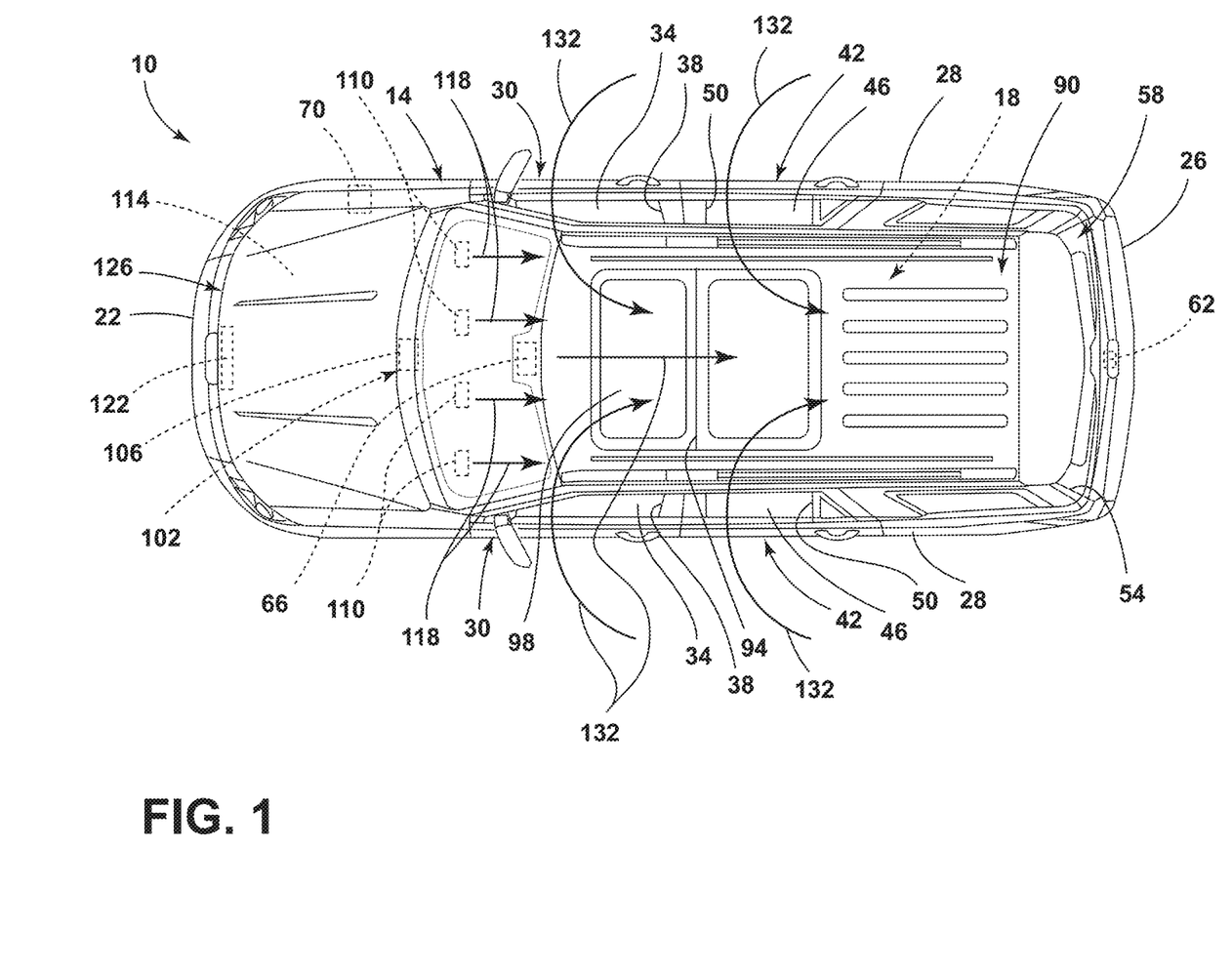
FIG. 1 is a top view of a vehicle, illustrating various aspects of the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to controlling vehicle components to adjust airflow within a passenger compartment. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-4, reference numeral 10 generally designates a vehicle. The vehicle 10 includes a body 14. A passenger compartment 18 is defined by the body 14. The vehicle 10 can include multiple seating assemblies that are arranged as a first row of seats, a second row of seats, and/or a third row of seats. The first row of seats may be arranged closest to a front 22 of the vehicle 10. The second row of seats can be arranged rearward of the first row of seats. The third row of seats can be arranged rearward of the second row of seats. In various examples, the second row of seats or the third row of seats can be arranged closest to a rear 26 of the vehicle 10. Sides 28 of the vehicle 10 extend between the front 22 and the rear 26 of the vehicle 10. Front side doors 30 of the vehicle 10 can each be provided with a first row window 34 that is operable between a first raised position and a first fully-opened position relative to a first window aperture 38. The front side doors 30, which are part of the body 14, and each defines a corresponding one of the first window apertures 38. Similarly, rear side doors 42 of the vehicle 10 can each be provided with a second row window 46 that is operable between a second raised position and a second fully-opened position relative to a second window aperture 50. The rear side doors 42, which are part of the body 14, each defines one of the second window apertures 50.

Referring again to FIGS. 1-4, the body 14 defines a rear aperture 54. A rear closure panel 58 is operable between a closed position and an open position relative to the rear aperture 54. A closure panel position sensor 62 senses a current position of the rear closure panel 58. An environmental precipitation sensor 66 senses a current environmental condition exterior to the vehicle 10. A speed sensor 70 senses a current speed of the vehicle 10. A controller 74 adjusts a degree of openness of at least one window chosen from the first row window(s) 34 and the second row window (s) 46 as a result of the closure panel position sensor 62 indicating that the rear closure panel 58 is in an open position, the speed sensor 70 indicating that a speed of the vehicle 10 is greater than zero kilometers per hour (kph), and the current environmental condition (e.g., precipitation present or no precipitation present) indicated by the environmental precipitation sensor 66. The controller 74 includes a processor 78 and memory 82. The memory 82 stores software routines 86 that are executable by the processor 78. In various situations, some of which will be discussed further herein, the software routines 86 within the memory 82 may be accessed by the controller 74 and/or the processor 78 in response to an input from the vehicle 10 (e.g., the closure panel position sensor 62, the environmental precipitation sensor 66, and/or the speed sensor 70).

Referring further to FIGS. 1-4, the vehicle 10 includes a roof 90. In some examples, the roof 90 can define one or more roof apertures 94. In examples that include the roof aperture 94, a roof-mounted window 98 can be included that is operable between a shut position and a fully-retracted position relative to the roof aperture 94. In various examples, the controller 74 can adjust a degree of openness of the roof-mounted window 98 as a result of the closure panel position sensor 62 indicating that the rear closure panel 58 is in the open position, the speed sensor 70 indicates that the speed of the vehicle 10 is greater than zero kph, and the current environmental condition is free of precipitation (e.g., not raining or snowing). In various examples, the controller 74 can adjust a degree of openness of at least one of the windows chosen from the first row window(s) 34 and the second row window(s) 46 to be in closer proximity to a corresponding raised position of the given window (e.g., the first raised position for the first row window(s) 34 or the second raised position for the second role window(s) 46 as the speed of the vehicle 10 increases.

Referring still further to FIGS. 1-4, the vehicle 10 includes an air circulation system 102 that can be selectively activated by the controller 74 as a result of the closure panel position sensor 62 indicating that the rear closure panel 58 is in the open position, the speed sensor 70 indicating that the speed of the vehicle 10 is greater than zero kph, and the current environmental condition that is indicated by the environmental precipitation sensor 66. The air circulation system 102 can include a blower 106 that is coupled to one or more air registers 110 by way of ductwork. The blower 106 can be utilized to increase a flow rate of air from regions that are external to the passenger compartment 18 (e.g., an engine compartment 114 or a region external to the body 14 of the vehicle 10). The increased flow rate of air induced by activation of the blower 106 results in airflow exiting the air registers 110, as indicated by arrows 118. In various examples, the vehicle 10 can be provided with an active grill shudder 122 that is positioned proximate to a grill 126 of the vehicle 10. The grill 126 is positioned proximate to the front 22 of the vehicle 10 and can define apertures through which air can enter the engine compartment 114 to provide a source of cooling for heat dissipation and/or a source of environmental air for the passenger compartment 18. The active grill shudder 122 may be positioned on an interior side of the grill 126. Said another way, the active grill shudder 122 may be positioned between the grill 126 and the engine compartment 114. The active grill shudder 122 can be utilized to impact aerodynamics and/or airflow to the vehicle 10. The active grill shudder 122 can be selectively adjusted by the controller 74 to increase a degree of openness of the active grill shudder 122 as a result of the closure panel position sensor 62 indicating that the rear closure panel 58 is in the open position, the speed sensor 70 indicating that the speed of the vehicle 10 is greater than zero kph, and based upon the current environmental condition indicated by the environmental precipitation sensor 66. When the active grill shudder 122 is in the closed position, airflow to the engine compartment 114 may be decreased. When the active grill shudder 122 is in an open position or a partially-open position, then the airflow to the engine compartment 114 can be increased and this increased airflow may be utilized by the air circulation system 102 to increase a flow rate of air from the air registers 110. The active grill shudder 122 may be provided with one or more panels that are operable between a substantially vertical position, which can correspond with the closed position, and a substantially horizontal position, which can correspond with the open position.

Referring again to FIGS. 1-4, an external airflow path 128 is shown for the vehicle 10 when the rear closure panel 58 in the closed position (FIG. 2) and the open position (FIG. 3). The external airflow path 128 is depicted for when the vehicle 10 is in motion. A pressure within the external airflow path 128 is larger at the front 22 of the vehicle 10 and along the sides 28 of the vehicle 10 than the pressure within the external airflow path 128 at the rear 26 of the vehicle 10.

Figure 2:
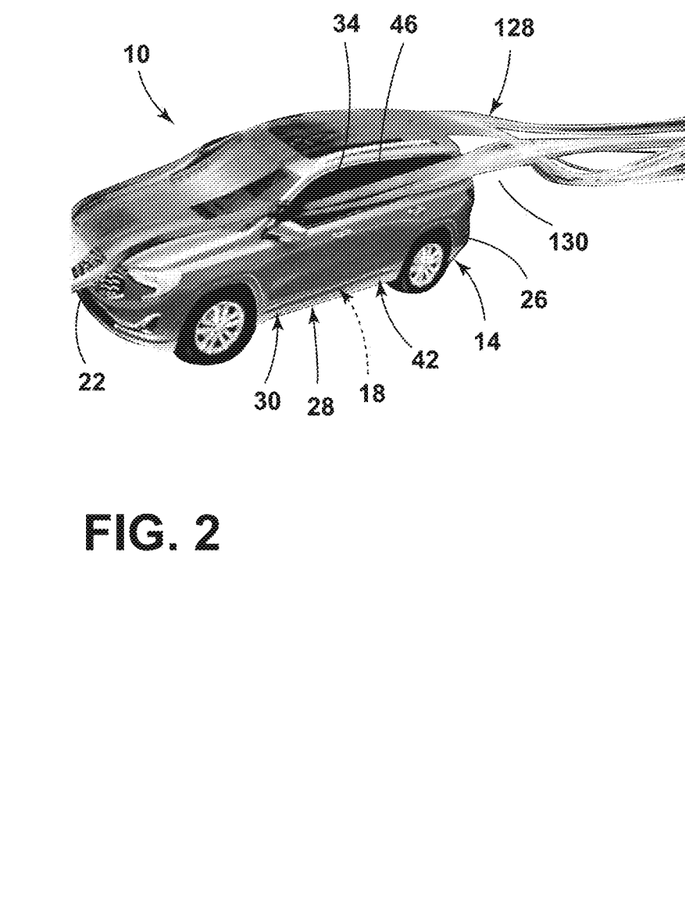
FIG. 2 is a side perspective view of the vehicle, illustrating an airflow pattern when a rear closure panel is in a closed position, according to one example.
Figure 3:
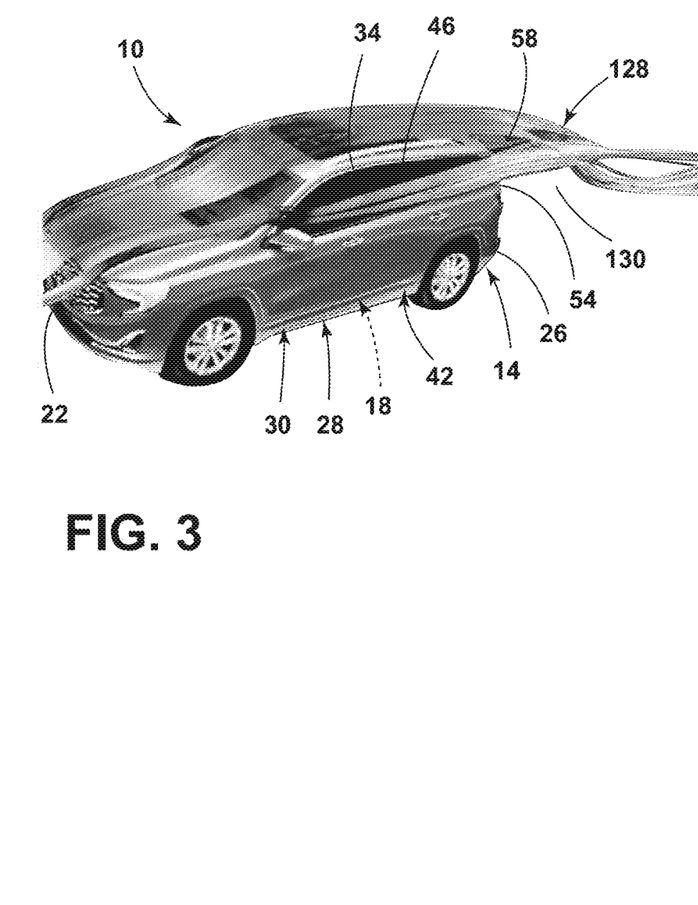
FIG. 3 is a side perspective view of the vehicle, illustrating the airflow pattern when the rear closure panel is in an open position, according to one example.
Figure 4:
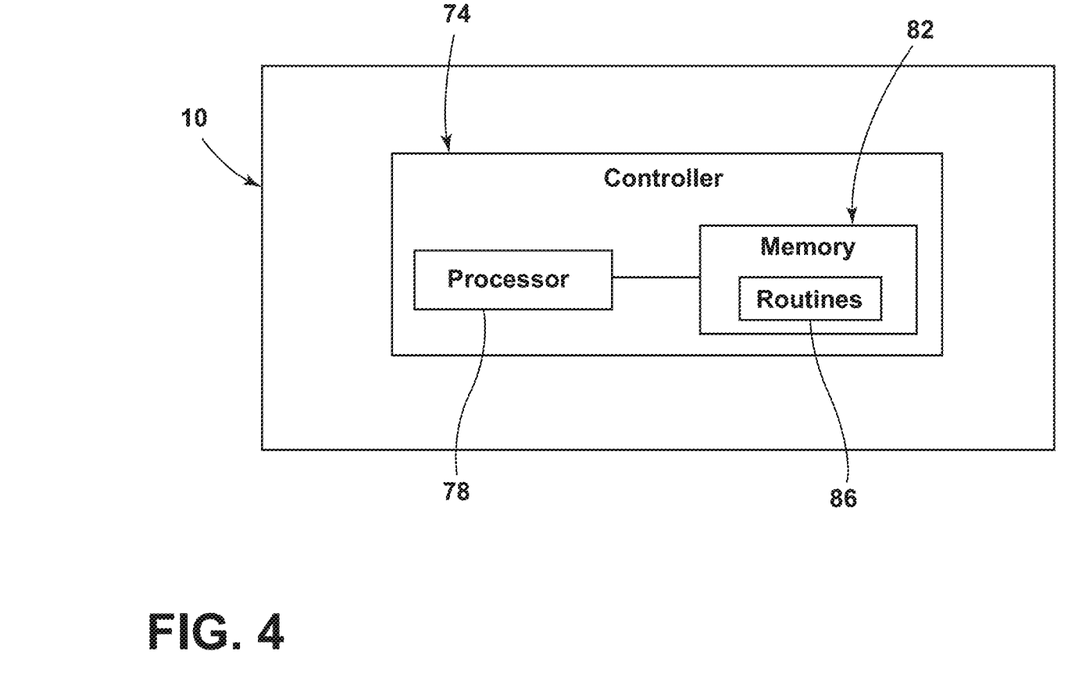
FIG. 4 is a schematic representation of the vehicle, illustrating a controller, according to one example.

Additionally, the rear 26 of the vehicle 10 and the external airflow path 128 define a draft volume 130 or dead space behind the vehicle 10 when the vehicle 10 is in motion. The draft volume 130 or dead space is increased when the rear closure panel 58 is in the open position while the vehicle 10 is in motion. The combination of the lower pressure at the rear 26 of the vehicle 10 and the increase in the draft volume 130 when the rear closure panel 58 is in the open position and the vehicle 10 is in motion contributed to a pressure differential at the rear 26 of the vehicle 10. The pressure differential at the rear 26 of the vehicle 10 can cause additional road noise, additional wind noise, and/or rear-to-front airflow paths within the passenger compartment 18 that detract from a user's overall experience. The pressure differential increases as the speed of the vehicle 10 increases when the rear closure panel 58 is in the open position and the vehicle 10 is in motion. Similarly, as the speed of the vehicle 10 increases, the pressure within the external airflow path 128 at the front 22 and the sides 28 of the vehicle 10 also increases. To counter act the additional road noise, additional wind noise, and/or rear-to-front airflow paths that can result within the passenger compartment 18 as a result of the pressure differential, the present disclosure provides a variety of methods of introducing external air into the passenger compartment 18. For example, one or more of the windows (e.g., the first row window(s) 34, the second row window(s) 46, and/or the roof-mounted window 98) can be opened to varying degrees depending upon, but not limited to, the speed of the vehicle 10, as indicated by arrows 132. Additionally, or alternatively, external air can be introduced into the passenger compartment 18 by way of the air circulation system 102, as indicated by arrows 118. As will be discussed in further detail herein, the increased pressure at the sides 28 of the vehicle 10 is taken into account in the present disclosure by adjusting the degree of openness of the one or more windows based upon the speed of the vehicle 10. For example, the one or more windows may be opened to a lesser extent at greater speeds of the vehicle 10 while maintaining sufficient airflow volume to counter act the additional road noise, additional wind noise, and/or rear-to-front airflow that can develop due to the increased pressure at the sides 28 of the vehicle 10.

Figure 5:
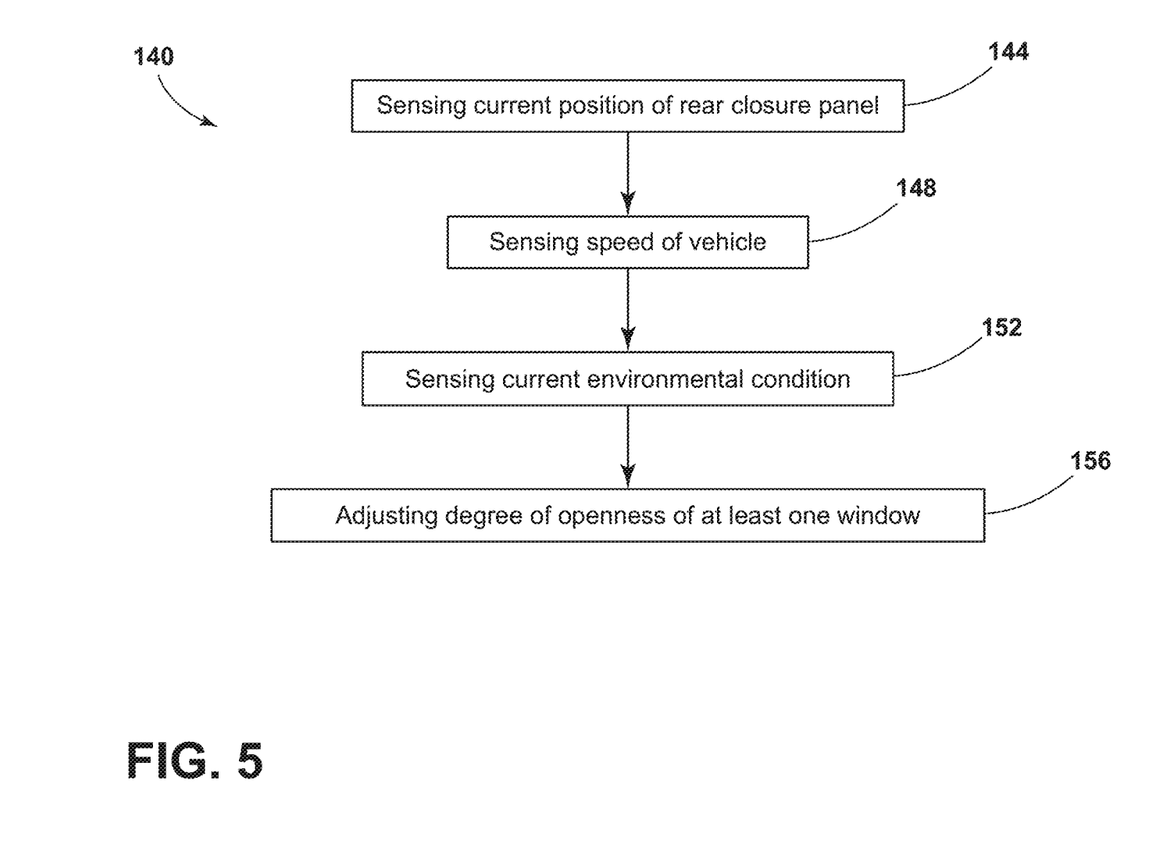
FIG. 5 is a flow diagram broadly illustrating a method of controlling components of the vehicle, according to one example.
Figure 6:
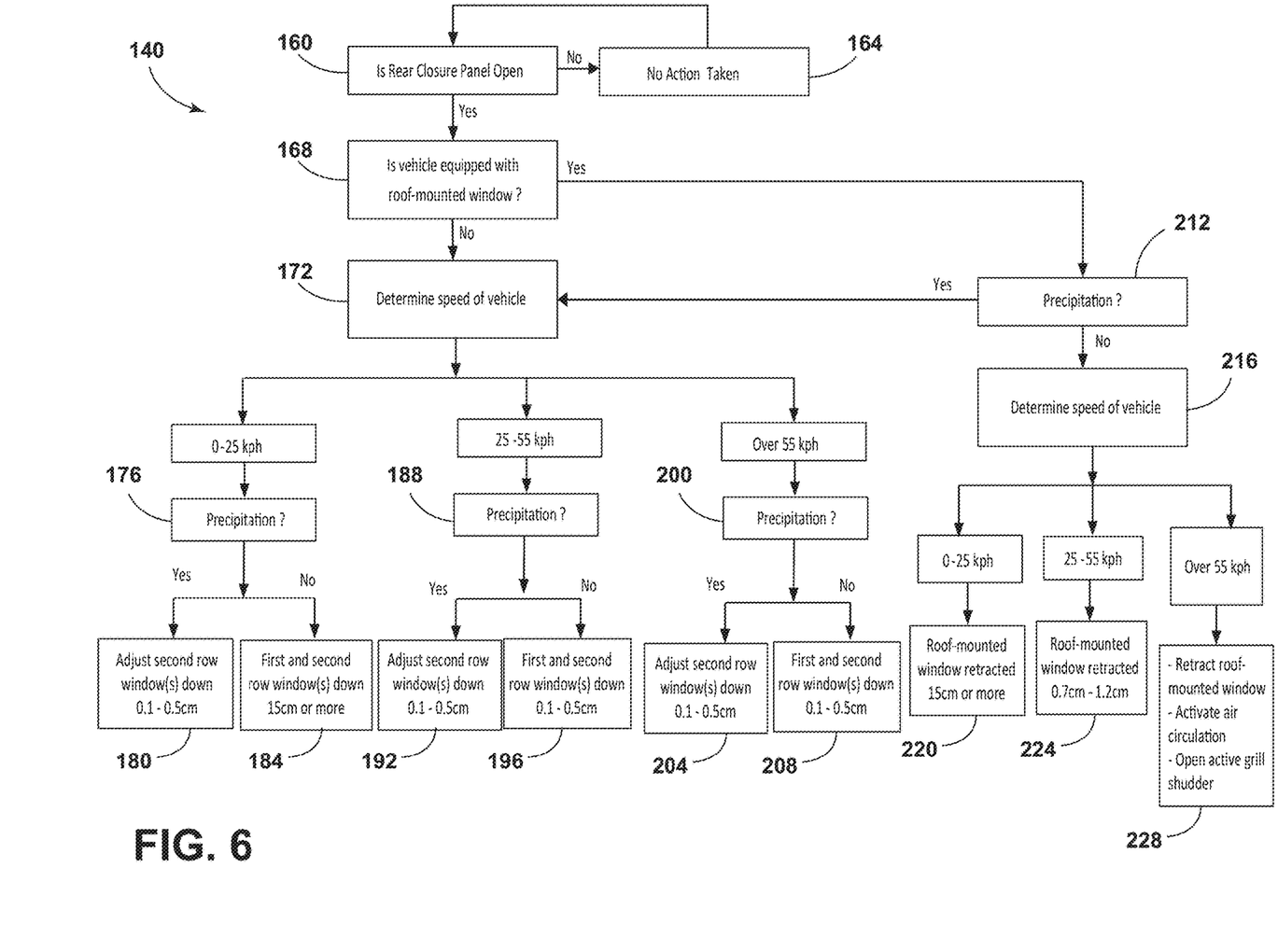
FIG. 6 is a flow diagram illustrating a more detailed method of controlling components of the vehicle, according to one example.

Referring to FIGS. 5 and 6, a method 140 of controlling components of the vehicle 10 is depicted according to one example. The method 140 includes step 144 of sensing a current position of the rear closure panel 58 with the closure panel position sensor 62. The method 140 also includes step 148 of sensing a speed of the vehicle 10 with the speed sensor 70. The method 140 further includes step 152 of sensing a current environmental condition with the environmental precipitation sensor 66. At step 156, the method 140 adjusts a degree of openness of at least one window (e.g., the first row window(s) 34 and/or the second row window(s) 46) as a result of the closure panel position sensor 62 indicating that the rear closure panel 58 is in the open position, the speed sensor 70 indicates that the speed of the vehicle 10 is greater than zero kph, and the current environmental condition that is indicated by the environmental precipitation sensor 66 (e.g., whether precipitation is present). In various examples, the step 144 of sensing a current position of the rear closure panel 58 with the closure panel position sensor 62 can include decision point 160 of determining whether the rear closure panel 58 is in the open position. If the method 140 determines at decision point 160 that the rear closure panel 58 is in the closed position (i.e., not in the open position), then the method 140 may advance to step 164 of taking no action. In such an example, the method 140 may return to decision point 160.

Referring again to FIGS. 5 and 6, if at decision point 160 the method 140 determines that the rear closure panel 58 is in the open position, then the method 140 may advance to decision point 168 of determining whether the vehicle 10 is equipped with the roof-mounted window 98. If at decision point 168 the method 140 determines that the vehicle 10 is not equipped with the roof-mounted window 98, then the method 140 may advance to step 172 of determining the speed of the vehicle 10. Determining the speed of the vehicle 10 at step 172 can be accomplished in the same manner articulated for step 148. More specifically, the speed of the vehicle 10 can be determined by way of the speed sensor 70. In various examples, the speed sensor 70 may be coupled to at least one wheel of the vehicle 10, with the speed sensor 70 registering a number of revolutions per minute of the wheel and providing such information to the controller 74. With the information from the speed sensor 70, the controller 74 may calculate the current speed of the vehicle 10. If the vehicle 10 is determined to be traveling at a speed that is greater than zero kph and less than about 25 kph, then the method 140 may advance to decision point 176 of determining whether the current environmental condition includes precipitation by referencing the environmental precipitation sensor 66. If the method 140 determines at step 176 that precipitation is present in the current environmental condition, then the method 140 may advance to step 180 of adjusting the second row window(s) 46 of the vehicle 10 to a position that is between about 0.1 cm lower than the second raised position and less than about 0.5 cm lower than the second raised position. In various examples, step 180 of adjusting the second row window(s) 46 of the vehicle 10 to a position that is between about 0.1 cm lower than a second raised position and less than about 0.5 cm lower than the second raised position when the current environmental condition is indicated as including precipitation by the environmental precipitation sensor 66 can also include activating the air circulation system 102 of the vehicle 10. In such an example, the method 140 may further include maximizing a blower speed of the blower 106 of the air circulation system 102. If the method 140 determines at step 176 at the current environmental condition is free of precipitation by referencing the environmental precipitation sensor 66, the method 140 may advance to step 184 of adjusting the first row window(s) 34 of the vehicle 10 to a position that is at least about 15 cm lower than the first raised position and adjusting the second row window(s) 46 of the vehicle 10 to a position that is at least about 15 cm lower than the second raised position.

Referring further to FIGS. 5 and 6, if method 140 determines at step 172 that the speed of the vehicle 10 is between about 25 kph and less than about 55 kph, then the method 140 may advance to decision point 188 of determining whether the current environmental condition includes precipitation. If the method 140 determines at decision point 188 that the current environmental condition includes precipitation, then the method 140 may advance to step 192 of adjusting the second row window(s) 46 of the vehicle 10 to a position that is between about 0.1 cm lower than the second raised position and less than about 0.5 cm lower than the second raised position. In various examples, step 192 of adjusting the second row window(s) 46 of the vehicle 10 to a position that is between about 0.1 cm lower than a second raised position and less than about 0.5 cm lower than the second raised position when the current environmental condition is indicated as including precipitation by the environmental precipitation sensor 66 can also include activating the air circulation system 102 of the vehicle 10. In such an example, the method 140 may further include maximizing a blower speed of the blower 106 of the air circulation system 102. If the method 140 determines at step 192 that the current environmental condition is free of precipitation, the method 140 may advance to step 196 of adjusting the first row window(s) 34 of the vehicle 10 to a position that is between about 0.1 cm lower than the first raised position and less than about 0.5 cm lower than the first raised position and adjusting the second row window(s) 46 of the vehicle 10 to a position that is between about 0.1 cm lower than the second raised position and less than about 0.5 cm lower than the second raised position. In some examples, the step 196 of the method 140 can include activating the air circulation system 102 of the vehicle 10. In such an example, the method 140 may further include maximizing the blower speed of the blower 106 of the air circulation system 102.

Referring still further to FIGS. 5 and 6, if the method 140 determines at step 172 that the speed of the vehicle 10 is at least about 55 kph, then the method 140 may advance to decision point 200 of determining whether precipitation is included in the current environmental condition by referencing the environmental precipitation sensor 66. If the method 140 determines at decision point 200 that the current environmental condition includes precipitation as a result of referencing the environmental precipitation sensor 66, then the method 140 may advance to step 204 of adjusting the second row window(s) 46 of the vehicle 10 to a position that is between about 0.1 cm lower than the second raised position and less than about 0.5 cm lower than the second raised position. In various examples, step 204 of adjusting the second row window(s) 46 of the vehicle 10 to a position that is between about 0.1 cm lower than the second raised position and less than about 0.5 cm lower than the second raised position when the current environmental condition is indicated as including precipitation by the environmental precipitation sensor 66 can also include activating the air circulation system 102 of the vehicle 10. In such an example, the method 140 may further include maximizing a blower speed of the blower 106 of the air circulation system 102. If the method 140 determines at decision point 200 that the current environmental condition is indicated as being free of precipitation by the environmental precipitation sensor 66, then the method 140 may advance to step 208 of adjusting the second row window(s) 46 of the vehicle 10 to a position that is between about 0.1 cm lower than the second raised position and less than about 0.5 cm lower than the second raised position. In various examples, the step 208 can also include activating the air circulation system 102 of the vehicle 10 and maximizing the blower speed of the blower 106 of the air circulation system 102. In such an example, the step 208 can further include increasing a degree of openness of the active grill shudder 122.

Referring again to FIGS. 5 and 6, if the method 140 determines at decision point 168 that the vehicle 10 is equipped with the roof-mounted window 98, then the method 140 may advance to decision point 212 of determining whether the current environmental condition includes precipitation by referencing the environmental precipitation sensor 66. If the method 140 determines at decision point 212 that precipitation is included in the current environmental condition, then the method 140 may advance to step 216 of determining the speed of the vehicle 10. In such an example, where the method 140 has determined that the vehicle 10 is equipped with the roof-mounted window 98 and the current environmental condition includes precipitation, then the method 140 may proceed in the manner articulated above for examples where the vehicle 10 is not equipped with the roof-mounted window 98. Said another way, if the method 140 determines that the vehicle 10 is equipped with the roof-mounted window 98 and that the current environmental condition includes precipitation, then the method 140 may advance as though the vehicle 10 is not equipped with the roof-mounted window 98 in an effort to prevent the roof-mounted window 98 from being opened and allowing the precipitation to enter the passenger compartment 18 through the roof aperture 94.

Referring yet again to FIGS. 5 and 6, if the method 140 determines at decision point 212 that the current environmental condition is free of precipitation by referencing the environmental precipitation sensor 66, then the method 140 may advance to step 216 of determining the speed of the vehicle 10. If the method 140 determines at step 216 that the speed of the vehicle 10 is greater than zero kph and less than about 25 kph, then the method 140 may advance to step 220 of adjusting the roof-mounted window 98 of the vehicle 10 to a position that is retracted by at least about 15 cm when compared to the shut position of the roof-mounted window 98. If the method 140 determines at step 216 that the speed of the vehicle 10 is between about 25 kph and about 55 kph, then the method 140 may advance to step 224 of adjusting the roof-mounted window 98 of the vehicle 10 to a position that is retracted by between about 0.7 cm and about 1.2 cm when compared to the shut position of the roof-mounted window 98. In some examples, step 224 can include activating the air circulation system 102 of the vehicle 10. In such an example, the step 224 can further include maximizing the blower speed of the blower 106 of the air circulation system 102. If the method 140 determines at step 216 that the current speed of the vehicle 10 is at least about 55 kph, then the method 140 may advance to step 228 of adjusting the roof-mounted window 98 of the vehicle 10 to a position that is retracted by between about 0.7 cm and about 1.2 cm when compared to the shut position of the roof-mounted window 98, activating the air circulation system 102 of the vehicle 10, maximizing the blower speed of the blower 106 of the air circulation system 102, and increasing the degree of openness of the active grill shudder 122 of the vehicle 10. Independent of whether the vehicle 10 is equipped with the roof-mounted window 98, whether the current environmental condition includes precipitation, and the current speed of the vehicle 10, the method 140 may notify a user regarding a reason for adjusting a degree of openness of at least one of the windows, the activation of the air circulation system 102, the maximization of the blower speed of the blower 106, and/or the adjusting a degree of openness of the active grill shudder 122. For example, a user interface (e.g., infotainment system, heads-up display, etc.) may communicate the notification to the user in audio and/or visual format.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A method of controlling components of a vehicle, the method comprising the steps of:
   sensing a current position of a rear closure panel with a closure panel position sensor;
   sensing a speed of the vehicle with a speed sensor;
   sensing a current environmental condition with an environmental precipitation sensor; and
   adjusting a degree of openness of at least one window as a result of the closure panel position sensor indicating that the rear closure panel is in an open position, the speed sensor indicating that a speed of the vehicle is greater than zero kph, and the current environmental condition indicated by the environmental precipitation sensor, including the steps of:
  adjusting a first row window of the vehicle to a position that is at least about 15 cm lower than a first raised position when the speed sensor indicates that the speed of the vehicle is greater than zero kph and less than about 25 kph and the current environmental condition is indicated as being free of precipitation by the environmental precipitation sensor; and
  adjusting a second row window of the vehicle to a position that is at least about 15 cm lower than a second raised position when the speed sensor indicates that the speed of the vehicle is greater than zero kph and less than about 25 kph and the current environmental condition is indicated as being free of precipitation by the environmental precipitation sensor.

2. A method of controlling components of a vehicle, the method comprising the steps of:
  sensing a current position of a rear closure panel with a closure panel position sensor;
  sensing a speed of the vehicle with a speed sensor;
  sensing a current environmental condition with an environmental precipitation sensor; and
  adjusting a degree of openness of at least one window as a result of the closure panel position sensor indicating that the rear closure panel is in an open position, the speed sensor indicating that a speed of the vehicle is greater than zero kph, and the current environmental condition indicated by the environmental precipitation sensor, including the steps of:
    adjusting a first row window of the vehicle to a position that is between about 0.1 cm lower than a first raised position and less than about 0.5 cm lower than the first raised position when the speed sensor indicates that the speed of the vehicle is between about 25 kph and less than about 55 kph and the current environmental condition is indicated as being free of precipitation by the environmental precipitation sensor; and
    adjusting a second row window of the vehicle to a position that is between about 0.1 cm lower than a second raised position and less than about 0.5 cm lower than the second raised position when the speed sensor indicates that the speed of the vehicle is between about 25 kph and less than about 55 kph and the current environmental condition is indicated as being free of precipitation by the environmental precipitation sensor.

3. The method of claim 2, further comprising the step of:
  activating an air circulation system of the vehicle when the speed sensor indicates that the speed of the vehicle is between about 25 kph and about 55 kph and the current environmental condition is indicated as being free of precipitation by the environmental precipitation sensor.

4. The method of claim 3, wherein the step of activating an air circulation system of the vehicle comprises:
  maximizing a blower speed of a blower of the air circulation system when the speed sensor indicates that the speed of the vehicle is between about 25 kph and about 55 kph and the current environmental condition is indicated as being free of precipitation by the environmental precipitation sensor.

5. A method of controlling components of a vehicle, the method comprising the steps of:
  sensing a current position of a rear closure panel with a closure panel position sensor;
  sensing a speed of the vehicle with a speed sensor;
  sensing a current environmental condition with an environmental precipitation sensor; and
  adjusting a degree of openness of at least one window as a result of the closure panel position sensor indicating that the rear closure panel is in an open position, the speed sensor indicating that a speed of the vehicle is greater than zero kph, and the current environmental condition indicated by the environmental precipitation sensor, including the steps of:
    adjusting a second row window of the vehicle to a position that is between about 0.1 cm lower than a second raised position and less than about 0.5 cm lower than the second raised position when the speed sensor indicates that the speed of the vehicle is at least about 55 kph and the current environmental condition is indicated as being free of precipitation by the environmental precipitation sensor.

6. The method of claim 5, further comprising the steps of:
  activating an air circulation system of the vehicle when the speed sensor indicates that the speed of the vehicle is at least about 55 kph and the current environmental condition is indicated as being free of precipitation by the environmental precipitation sensor, and
  maximizing a blower speed of a blower of the air circulation system when the speed sensor indicates that the speed of the vehicle is at least about 55 kph and the current environmental condition is indicated as being free of precipitation by the environmental precipitation sensor.

7. The method of claim 6, further comprising the step of:
  increasing a degree of openness of an active grill shudder of the vehicle when the speed sensor indicates that the speed of the vehicle is at least about 55 kph.

8. The method of claim 1, further comprising the step of:
  notifying a user regarding a reason for the adjusting a degree of openness of at least one window.

9. The method of claim 1, wherein the step of adjusting a degree of openness of at least one window as a result of the closure panel position sensor indicating that the rear closure panel is in an open position, the speed sensor indicating that a speed of the vehicle is greater than zero kph, and the current environmental condition indicated by the environmental precipitation sensor comprises:
  adjusting a second row window of the vehicle to a position that is between about 0.1 cm lower than a second raised position and less than about 0.5 cm lower than the second raised position when the current environmental condition is indicated including precipitation by the environmental precipitation sensor.

10. The method of claim 9, further comprising the steps of:
  activating an air circulation system of the vehicle when the current environmental condition is indicated as including precipitation by the environmental precipitation sensor; and
  maximizing a blower speed of a blower of the air circulation system when the current environmental condition is indicated as including precipitation by the environmental precipitation sensor.

11. A method of controlling components of a vehicle, the method comprising the steps of:

sensing a current position of a rear closure panel with a closure panel position sensor;

sensing a speed of the vehicle with a speed sensor;

sensing a current environmental condition with an environmental precipitation sensor; and adjusting a degree of openness of at least one window as a result of the closure panel position sensor indicating that the rear closure panel is in an open position, the speed sensor indicating that a speed of the vehicle is greater than zero kph, and the current environmental condition indicated by the environmental precipitation sensor, including the steps of:

adjusting a roof-mounted window of the vehicle to a position that is retracted by at least about 15 cm when compared to a closed position when the speed sensor indicates that the speed of the vehicle is greater than zero kph and less than about 25 kph and the current environmental condition is indicated as being free of precipitation by the environmental precipitation sensor.

12. A method of controlling components of a vehicle, the method comprising the steps of:

sensing a current position of a rear closure panel with a closure panel position sensor;

sensing a speed of the vehicle with a speed sensor;

sensing a current environmental condition with an environmental precipitation sensor; and adjusting a degree of openness of at least one window as a result of the closure panel position sensor indicating that the rear closure panel is in an open position, the speed sensor indicating that a speed of the vehicle is greater than zero kph, and the current environmental condition indicated by the environmental precipitation sensor, including the steps of:

adjusting a roof-mounted window of the vehicle to a position that is retracted by between about 0.7 cm and about 1.2 cm when compared to a closed position of the roof-mounted window when the speed sensor indicates that the speed of the vehicle is at least about 25 kph.

13. The method of claim 12, further comprising the step of:

activating an air circulation system of the vehicle when the current environmental condition is indicated as being free of precipitation by the environmental precipitation sensor.

14. The method of claim 13, further comprising the step of:

maximizing a blower speed of a blower of the air circulation system when the current environmental condition is indicated as being free of precipitation by the environmental precipitation sensor.

15. The method of claim 13, further comprising the step of:

increasing a degree of openness of an active grill shudder of the vehicle when the speed sensor indicates that the speed of the vehicle is at least about 55 kph.

* * * * *